United States Patent [19]

Mann

[11] Patent Number: 4,487,618
[45] Date of Patent: Dec. 11, 1984

[54] AIRLINE VAPOR TRAP

[75] Inventor: David O. Mann, Marshall, Mich.

[73] Assignee: La-Man Corporation, Hamilton, Ind.

[21] Appl. No.: 409,539

[22] Filed: Aug. 19, 1982

[51] Int. Cl.³ .............................................. B01D 50/00
[52] U.S. Cl. ......................................... 55/323; 55/333; 55/418; 55/423; 55/520; 55/DIG. 25; 55/525; 55/498; 55/482
[58] Field of Search ........... 55/320, 97, 323, DIG. 25, 55/DIG. 17, 324, 327, 333, 423, 426, 427, 482, 498, 520, 418, 525, 510; 210/311, 310, 497.01, 440, 446, 493.4, 497.1

[56] References Cited

U.S. PATENT DOCUMENTS

| | | | |
|---|---|---|---|
| 945,632 | 1/1910 | Strahl | 55/498 |
| 1,825,031 | 9/1931 | Volk . | |
| 1,937,855 | 12/1933 | Stuard . | |
| 2,521,785 | 9/1950 | Goodloe . | |
| 2,580,317 | 12/1951 | Pekar et al. | 55/426 |
| 2,992,700 | 7/1961 | Silverman et al. | 55/418 |
| 3,063,888 | 11/1962 | Howard et al. . | |
| 3,186,148 | 6/1965 | Merrill et al. . | |
| 3,252,270 | 5/1966 | Pall et al. . | |
| 3,358,428 | 12/1967 | Mann . | |
| 3,708,959 | 1/1973 | Soumerai | 55/97 |
| 3,724,177 | 4/1973 | Grote . | |
| 3,791,105 | 2/1974 | Rhodes | 55/97 |
| 3,822,531 | 7/1974 | Wisnewski et al. . | |
| 3,877,451 | 4/1975 | Lipscomb | 55/498 |
| 4,015,959 | 4/1977 | Grote . | |
| 4,116,650 | 9/1978 | Lane . | |
| 4,385,913 | 5/1983 | Lane | 55/387 |
| 4,400,187 | 8/1983 | Lane | 55/387 |

FOREIGN PATENT DOCUMENTS 1367701  9/1974  United Kingdom ................. 55/498

Primary Examiner—Bernard Nozick
Attorney, Agent, or Firm—Barnes, Kisselle, Raisch, Choate, Whittemore and Hulbert

[57] ABSTRACT

An in-line trap for removing water and/or oil vapor from a compressed airline which includes a manifold having spaced coaxial inlet and outlet openings and a hollow base suspended from the manifold. A first cartridge extends between the manifold inlet and the enclosed volume within the hollow base, and includes a wire fiber pad adapted to coalesce water and/or oil vapor in air passing therethrough into droplets which are then entrained by the air and carried into the base volume. Within the base, a plate having parallel louvers or vanes upwardly struck therefrom in a direction opposed to air travel is supported with respect to the base bottom wall by a honeycomb spacer which forms a dead air space beneath the louver plate. The louvers function to trap vapor droplets which fall by gravity from the air entering the base volume. A second cartridge, which includes spirally wound fiber and wire mesh materials, directs compressed air from within the base volume to the manifold outlet and simultaneously functions to remove any remaining vapor therefrom.

16 Claims, 5 Drawing Figures

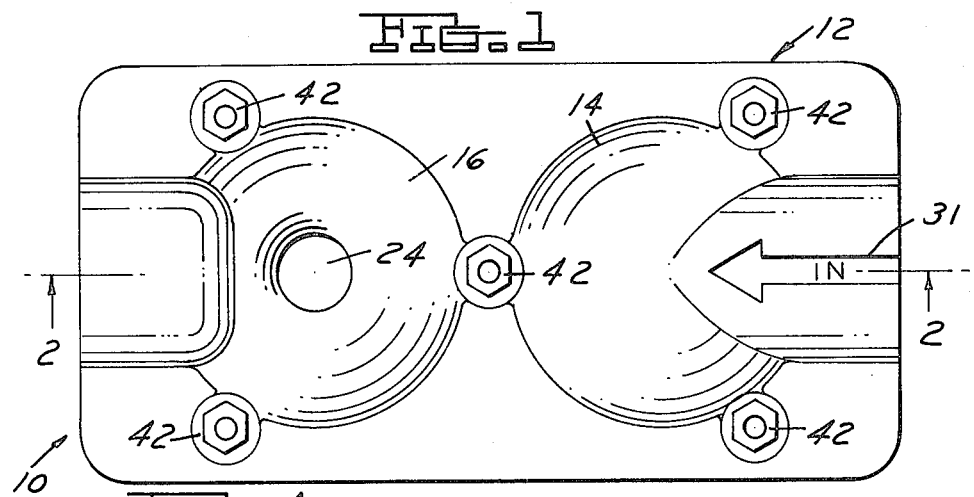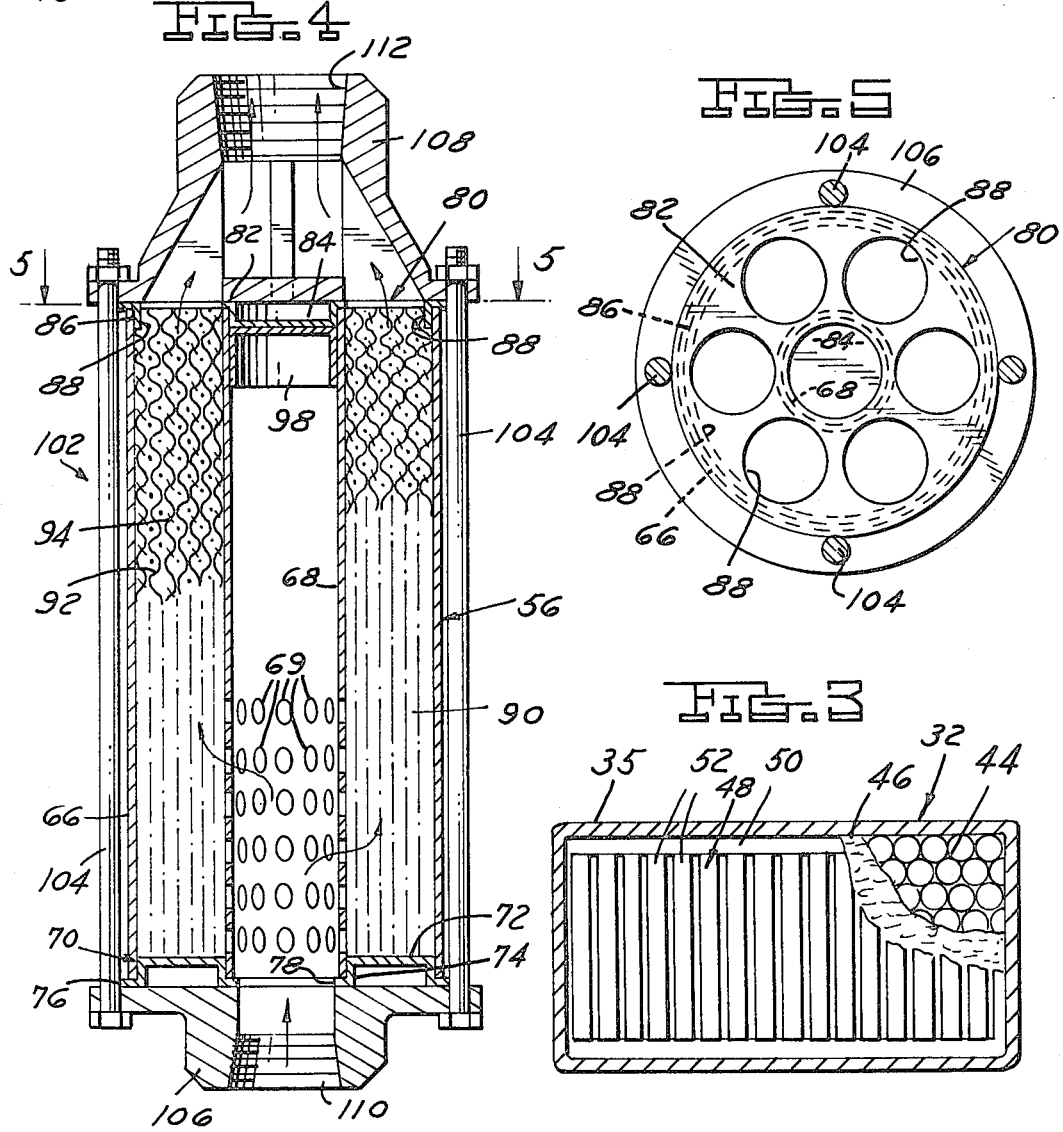

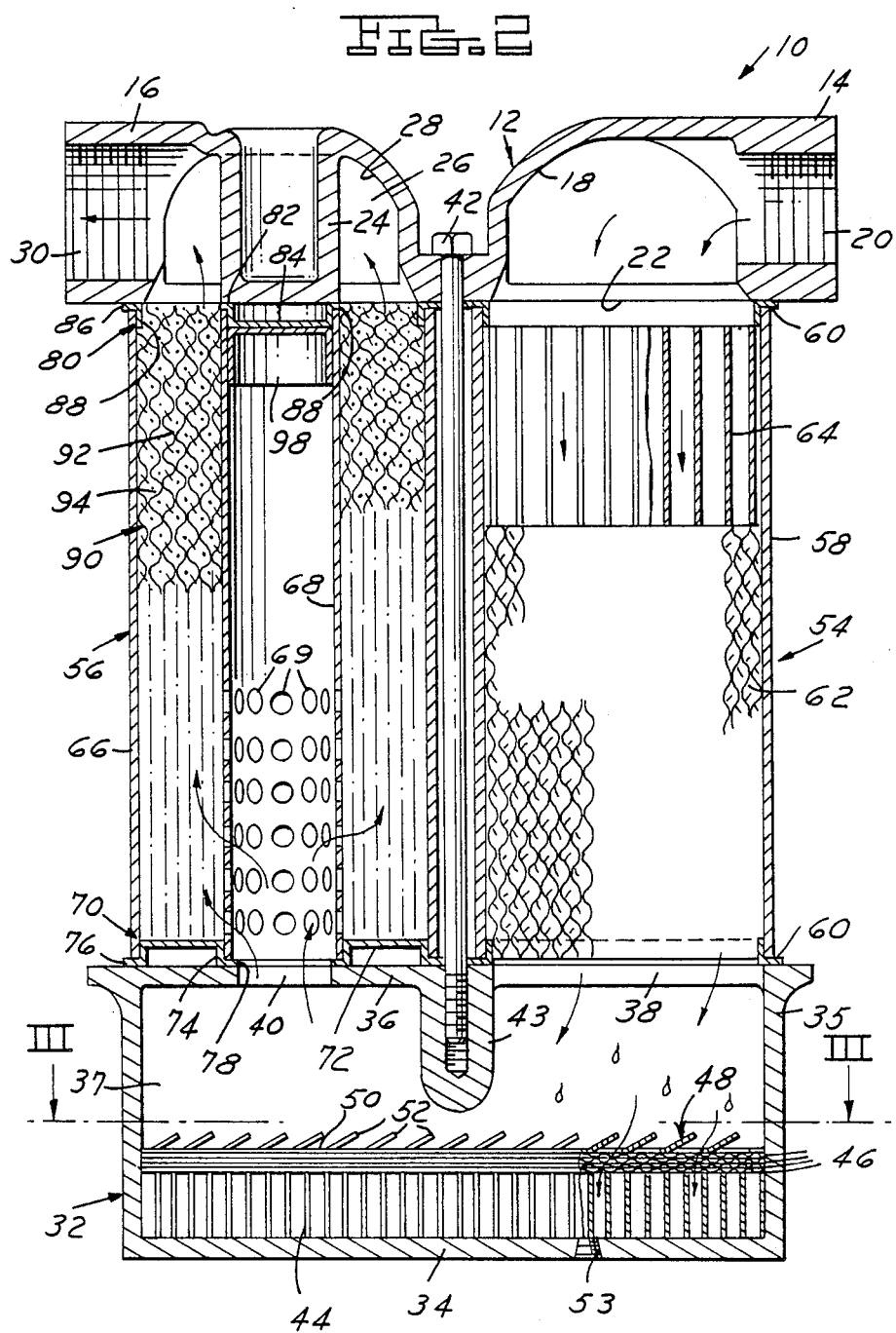

AIRLINE VAPOR TRAP

The present invention is directed to devices of a type adapted to remove oil and/or water vapor from a flowing gaseous medium such as compressed air.

An object of the present invention is to provide a vapor trap of the described type which is economical in assembly and which provides reliable service over an extended operating lifetime.

Another object of the present invention is to provide a trap for removing oil and water vapor from a compressed airline or the like which exhibits improved efficiency as compared with vapor traps of types heretofore proposed for similar applications.

Yet another object of the present invention is to provide a vapor trap wherein expendable portions of the trap are provided in the form of cartridges which may be readily replaced in the field by relatively unskilled personnel.

The foregoing and other objects, features and advantages of the present invention will be best understood from the following description, the appended claims and the accompanying drawings in which:

FIG. 1 is a top plan view of a presently preferred embodiment of the vapor trap provided in accordance with the present invention;

FIG. 2 is an elevational bi-sectional view taken in a vertical plane through the vapor trap of the invention, as along the line 2—2 in FIG. 1;

FIG. 3 is a sectional view taken along the line III—III in FIG. 2;

FIG. 4 is an elevational bi-sectional view of an alternative embodiment of the invention; and FIG. 5 is a sectional view taken along the line 5—5 in FIG. 4.

FIGS. 1-3 illustrate a presently preferred embodiment 10 of a vapor trap in accordance with the invention as comprising cap or manifold 12 having oppositely directed and coaxially aligned internally threaded embossments 14,16 respectively defining an inlet and outlet adapted for in-line connection to a gas line such as a compressed airline. Inlet embossment 14 is hollow and part-spherical in contour, having a concave internal surface 18 in opposition to threaded opening 20 for directing inlet air orthogonally of the inlet axis, or downwardly in the orientation of FIG. 2. The bottom 22 of manifold 12 is flat, with the central portion 24 of outlet embossment 16 being depressed to the plane of manifold bottom 22. An open annular region 26 within embossment 16 is defined in part by an internal concave surface 28 which directs air entering embossment 26 from the upward direction orthogonally to the axis of internally threaded outlet opening 30. Indicia as at 31 (FIG. 1) is provided on manifold 12 to insure proper connection in the field.

A base 32 (FIGS. 2 and 3) of generally rectangular construction comprises a bottom wall 34, a continuous peripheral wall 35 and a flat top wall 36 which cooperate to form an enclosed volume 37. Base 32 is suspended from manifold 12 by a plurality of bolts 42 which are received in corresponding internally threaded bosses 43 with volume 37. A pair of laterally spaced openings 38,40 are formed in top wall in respective coaxial alignment in assembly with inlet and outlet embossments 14,16 respectively. A spacer 44 of one-piece metal or plastic honeycomb construction is disposed along and carried by base bottom wall 34 and supports a plurality of metal wire mesh screens 46 in parallel spaced relation to the bottom wall. A louver plate 48 rests on screens 46 and comprises a flat base 50 of sheet metal or the like from which a plurality of spaced parallel vanes 52 are struck. Vanes 52 extend in a direction orthogonal to the longitudinal dimension of plate 48 at an acute angle with respect to base 50, and are oriented in assembly within base 32 so as to project at an angle toward opening 38 aligned with inlet embossment 14. Base 32 and manifold 12 may be of cast aluminum construction, for example. An internally threaded drain opening 53 is formed in wall 34 and may receive a suitable drain cock or plug (not shown).

A pair of laterally spaced replaceable vaporizer cartridges 54,56 are clamped by bolts 42 between manifold 12 and base 32 in sealing engagement with the opposing wall surfaces 22,36. Cartridge 54, which is clamped in axial alignment between inlet embossment 14 and base opening 38, comprises a cylindrical cartridge outer wall 58 having a pair of annular L-shaped end gaskets 60 in sealing abutment with the opposing planar surfaces of manifold 12 and base 32. Within wall 58, cartridge 54 comprises a mass or pad 62 of wire mesh fibers of a type adapted to coalesce water or oil vapor passing therethrough into vapor droplets. Pad 62 in one working embodiment of the invention comprises a so-called "Goodloe column packing" of a type disclosed in U.S. Pat. No. 2,521,785. Extending upwardly from pad 62 within wall 58 in the direction of inlet embossment 14 and resting on pad 62 in assembly is a honeycomb spacer 64. The purpose of honeycomb spacer 64 is to laminate incoming air directed therethrough for substantially unidirectional non-turbulent passage into fiber pad 62. Pad 62 and spacer 64 extend diametrically across and "fill" cartridge outer wall 58. The dimension of cartridge 54 cross-sectional to air flow is substantially less than that of the enclosed volume 37 within base 32.

Cartridge 56, which is clamped in axial alignment between outlet embossment 16 and base opening 40, comprises an outer cylindrical wall 66 and an inner hollow tubular column 68 coaxial with wall 66. A multiplicity of radial perforations or openings 69 are formed in column 68 adjacent one end and over about one-half of its axial length. An end cap 70 comprises a flat disc body 72 having a central region 74 and a periphery 76 offset therefrom in a common plane. Central cap portion 74 is received by press-fit over the perforated end of column 68 and has a circular opening 78 which communicates with the interior of column 68 and is aligned in assembly with opening 40. The periphery 76 of disc 72 is received and held by press-fit within the lower edge of cartridge wall 66. Central and peripheral regions 74,76 of end cap 70 are in sealing engagement with the opposing planar surface of base 32 in assembly.

An upper end cap 80 is received over the upper edge of cartridge wall 66. End cap 80 (FIGS. 2 and 5) comprises a flat disc body 82 having an offset central region 84 received by press-fit within the upper edge of column 68. The periphery 86 of upper end cap 80 is flanged and received by press-fit within cartridge wall 66. A circumferential array of openings 88 (FIGS. 2 and 5) are formed around disc body 82 between the central and peripheral regions thereof and are aligned in assembly (FIG. 2) with the open annular region 26 of outlet embossment 16. End caps 70,80 may be of nylon construction, for example. Wound around column 68, and filling the entire volume radially between column 68 and cartridge wall 66 and the opposed internal axial surfaces of end caps 70,80, is an absorbent plug structure 90 consisting of alternating spiral layers of wire mesh or screen 92 and absorbent fabric 94. Plug 90 is similar to that shown in U.S. Pat. No. 4,116,650 and in U.S. application Ser. No. 338,913, now U.S. Pat. No. 4,400,187, filed Jan. 12, 1982 as a continuation of application Ser. No. 134,876 filed Mar. 28, 1980, now abandoned. The end of column 68 remote from opening 40 is closed by a plug 98 which is press-fitted into column 68 prior to assembly thereto of end cap 80.

In operation, air with entrained water and/or oil vapor is received through inlet opening 20 and directed by surface 18 of embossment 14 downwardly through honeycomb spacer 64 into pad 62. During passage through the latter, the water and/or oil vapors are coalesced into droplets which are entrained in the flowing air mass and carried thereby into open region 37 within base 32. Since the cross dimension to air flow within open volume 37 is greater than that within cartridge 54, the velocity of air entering the open base is reduced and the entrained droplets fall by gravity and centrifugal force toward the lower portion of the base. Angulated vanes 52, which project in a direction opposite to the general direction of air flow, serve to trap the falling droplets, which are then fed through screens 46 into the essentially zero velocity or "dead" space within honeycomb spacer 44. It will be appreciated that the construction of honeycomb spacer 44 prevents substantial air movement therewithin. Revaporization is thereby substantially eliminated.

In the meantime, the compressed air stream, which is now 75% to 95% dry, is fed through opening 40 into column 68, and then through the radial perforations 69 into the absorbent plug 90. As the air passes axially through the annular plug structure to and through end cap openings 88, any remaining vapor is removed by the plug material. It will be appreciated that either or both of the cartridges 54,56 may be readily removed and replaced by loosening of all bolts 42 and removal of one bolt at a corner of manifold 12 (FIG. 1) adjacent the particular cartridge.

FIGS. 4 and 5 illustrate a second preferred embodiment 102 of the invention which includes a cartridge 56 identical to that previously described in detail in connection with FIGS. 1–3 clamped by the bolts 104 between axially opposed inlet and outlet caps 106,108. Compressed air enters inlet cap 106 which has an internally threaded cenral opening 110 aligned with column 68. The air is fed through the perforations 96 and through absorbent plug 90 to and through end cap 80, and then through the internally threaded outlet opening 112 in cap 108. As was the case with the preferred embodiment of the invention described in connection with FIGS. 1–3, cartridge 56 in the embodiment of FIGS. 4 and 5 may be readily replaced by loosening of the bolts 104.

The invention claimed is:

1. An in-line trap for removing vapor from a compressed airline or the like comprising a manifold including spaced means defining an inlet and an outlet, and means between said spaced means for directing incoming air downwardly from said inlet and receiving air directed upwardly toward said outlet, enclosure means defining an enclosed volume suspended beneath and spaced from said manifold, first means mounted and extending between said inlet and said enclosure means for directing incoming air downwardly into said enclosed volume, said first means including means adapted to promote coalescence of vapor in air passing therethrough into droplets, second means mounted and extending between said enclosure means and said outlet for directing air from said enclosed volume to said outlet, and means disposed within said enclosed volume to capture vapor droplets in air entering said enclosed volume, said capture means comprising a porous structure positioned to occupy a lower portion of said enclosed volume and having passages for admitting water droplets, said passages cooperating with said enclosure means and with each other for substantially preventing air flow through said porous structure so as to define a zone of substantially zero air movement, cross-sectional dimension to air flow in said enclosure means being substantially greater than within said first means, such that air velocity is reduced within said enclosure means and vapor droplets fall by gravity and centrifugal force toward said zone.

2. The trap set forth in claim 1 wherein said porous structure comprises an integral honeycomb structure having passages which extend downwardly within said volume to a bottom wall of said enclosure means.

3. The trap set forth in claim 2 wherein said capture means further comprises means angulated in a direction opposite to air flow within said enclosed volume.

4. An in-line trap for removing vapor from a compressed airline or the like comprising a manifold including spaced means defining an inlet and an outlet, and means between said spaced means for directing incoming air downwardly from said inlet and receiving air directed upwardly toward said outlet, enclosure means defining an enclosed volume suspended beneath and spaced from said manifold, first means mounted and extending between said inlet and said enclosure means for directing incoming air downwardly into said enclosed volume, said first means including means adapted to promote coalescence of vapor in air passing therethrough into droplets, second means mounted and extending between said enclosure means and said outlet for directing air from said enclosed volume to said outlet, means disposed within said enclosed volume to capture vapor droplets in air entering said enclosed volume, said capture means comprising means disposed in a lower portion of said enclosed volume to define a zone of substantially zero air movement, cross-sectional dimension to air flow in said enclosure means being substantially greater than within said first means, such that air velocity is reduced within said enclosure means and vapor droplets fall by gravity and centrifugal force toward said zone, and a plurality of vanes carried above said zone and angulated in a direction oppsed to air flow within said enclosed volume.

5. The trap set forth in claim 4 further comprising a flat plate having a uniformly spaced array of said vanes integrally projecting therefrom.

6. The trap set forth in claim 5 wherein said plate is of sheet metal construction having said vanes integrally struck therefrom.

7. The trap set forth in claim 5 wherein said means defining said zone comprises spacer means carried by said enclosure means, said flat plate being carried by said spacer means.

8. The trap set forth in claim 7 wherein said spacer means comprises an integral honeycomb structure.

9. The trap set forth in claim 8 wherein said spacer means further comprises at least one mesh screen disposed beneath said flat plate.

10. An in-line trap for removing vapor from a compressed airline or the like comprising a manifold including spaced means defining an inlet and an outlet, and means between said spaced means for directing incoming air downwardly from said inlet and receiving air directed upwardly toward said outlet, enclosure means defining an enclosed volume suspended beneath and spaced from said manifold, a first cartridge having an outer wall and means disposed within said wall adapted to promote coalescence of vapor in air passing therethrough into droplets, means adapted removably to capture said first cartridge with said cartridge wall being mounted and extending between said manifold inlet and said enclosure means for directing incoming air downwardly into said enclosed volume, a second cartridge for removing vapor captured so as to be mounted and extend between said enclosure means and said manifold outlet for directing air from said enclosed volume to said outlet, and means disposed within said enclosed volume to capture vapor droplets in air entering said enclosed volume, said capture means comprising means disposed in a lower portion of said enclosed volume to define a zone of substantially zero air movement, cross-sectional dimension to air flow in said enclosure means being substantially greater than within said first means, such that air velocity is reduced within said enclosure means and vapor droplets fall by gravity and centrifugal force toward said zone.

11. The trap set forth in claim 10 wherein said second cartridge includes supplemental vapor absorption means comprising a mass of fabric material and means for directing air from said enclosure means through said fabric material to said outlet.

12. The trap set forth in claim 10 wherein said first cartridge further comprises means disposed within said wall and adapted to be positioned adjacent said inlet for reducing turbulence in incoming air between said inlet and said coalescence means.

13. The trap set forth in claim 12 wherein said turbulence reducing means comprises an integral honeycomb structure extending from adjacent an end of said first cartridge adapted to be disposed adjacent said inlet to said coalescence means.

14. A trap for removing oil and water vapor from a compressed airline or the like comprising
a manifold including spaced inlet and outlet means adapted for coaxial in-line connection to a compressed airline and means adjacent said inlet means for directing incoming air downwardly,
enclosure means having a bottom wall and a side wall suspended beneath said manifold and defining an enclosed volume,
first means mounted and extending between said inlet means and said enclosure means for directing incoming air from said inlet means into said enclosed volume,
said first means including means adapted to promote coalescence of vapors in air passing therethrough into droplets, droplets entrained in air entering said enclosed volume tending to fall by gravity toward a lower portion of said enclosed volume,
an integral honeycomb structure disposed in said lower portion of said enclosed volume on said bottom wall and within said side wall, passages within said honeycomb structure extending downwardly toward said bottom wall and cooperating with each other and with said side wall to define a zone of substantially zero air movement for capturing falling droplets, and
second means structurally separate from said first means mounted and extending between said enclosure means and said outlet means for directing air from within said enclosed volume to said outlet means, said second means including supplemental vapor absorption means comprising a mass of absorbent material and means for directing air through said absorbent material between said enclosed volume and said outlet.

15. The trap set forth in claim 14 wherein said first and second means comprise respectively separate cartridges each including a substantially cylindrical outer wall, and
wherein said trap further comprises means for releasably clamping said cartridges between said manifold and said enclosure means such that said cylindrical outer walls define separate parallel air flow paths to and from said enclosure means.

16. The trap set forth in claim 15 wherein clamping means comprises a plurality of bolts having axes parallel to said flow paths.

* * * * *